(12) United States Patent
Wang et al.

(10) Patent No.: US 7,074,887 B2
(45) Date of Patent: Jul. 11, 2006

(54) CHEMICAL SYNTHESIS OF CHIRAL CONDUCTING POLYMERS

(75) Inventors: Hsing-Lin Wang, Los Alamos, NM (US); Wenguang Li, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 468 days.

(21) Appl. No.: 10/321,155

(22) Filed: Dec. 17, 2002

(65) Prior Publication Data

US 2006/0122366 A1   Jun. 8, 2006

(51) Int. Cl.
*C08G 73/00* (2006.01)
(52) U.S. Cl. .................. 528/422; 528/482; 528/486; 528/491; 528/377; 528/378
(58) Field of Classification Search ............... 528/422, 528/486, 491, 377, 378, 482
See application file for complete search history.

(56) References Cited

U.S. PATENT DOCUMENTS

| 5,489,400 A | 2/1996 | Liu |
| 6,090,985 A | 7/2000 | MacDiarmid |

FOREIGN PATENT DOCUMENTS

| WO | WO 98/04514 | * 2/1998 |

OTHER PUBLICATIONS

Kane-Maguire et al., "Facile Preparation of Optically Active Polyanilines Via The In Situ Chemical Oxidative Polymerisation of Aniline," Synthetic Metals, 106 (1999) 171-176.

(Continued)

*Primary Examiner*—Duc Truong
(74) *Attorney, Agent, or Firm*—Bruce H. Cottrell (57) ABSTRACT

An process of forming a chiral conducting polymer, e.g., polyaniline, is provided including reacting a monomer, e.g., an aniline monomer, in the presence of a chiral dopant acid to produce a first reaction mixture by addition of a solution including a first portion of an oxidizing agent, the first portion of oxidizing agent characterized as insufficient to allow complete reaction of the monomer, and further reacting the first reaction mixture in the presence of the chiral dopant acid by addition of a solution including a second portion of the oxidizing agent, the second portion of oxidizing agent characterized as insufficient to allow complete reaction of the monomer, and repeating the reaction by addition of further portions of the oxidizing agent until the monomer reaction is complete to produce a chiral conducting polymer, e.g., polyaniline. A preferred process includes addition of a catalyst during the reaction, the catalyst selected from among the group consisting of phenylene diamine, aniline oligomers and amino-capped aniline oligomers and metal salts.

The processes of the present invention further provide a resultant polyaniline product having a chirality level defined by a molar ellipticity of from about $40 \times 10^3$ degree-$cm^2$/decimole to about $700 \times 10^3$ degree-$cm^2$/decimole. The processes of the present invention further provide a resultant polyaniline product having a nanofiber structure with a diameter of from about 30 nanometers to about 120 nanometers and from about 1 micron to about 5 microns in length.

13 Claims, 10 Drawing Sheets

OTHER PUBLICATIONS

Sun et al., "Double-Strand Polyaniline", Synthetic Metals, 84 (1997) 67-68.

Aboutanos et al., "Electrochemical Prepartion of Chiral Polyaniline Nanocomposites," Synthetic Metals, 106 (1999) 89-95.

Barisci et al., "Preparation of Chiral Conducting Polymer Colloids," Synthetic Metals, 84 (1997) 181-182.

Innis et al., "Electrochemical Formation of Chiral Polyaniline colloids Codoped with (+) or (−) -10- Camphorsulfonic Acid and Polystyrene Sulfonate," Macromolecules 1998, 31, 6521-6528.

Majidi et al., "Chemical Generation of Optically Active Polyaniline via the Doping of emeraldine Base with (+) or (−)-Camphorsulfonic Acid," Polymer, vol. 36 No. 18, 1995.

Cushman et al., "Spectroelectrochemical Study of Polyaniline: The Construction of a pH-Potential Phase Diagram," J Electroanal Chem Interfacial Electrochem, (1987), vol. 219, pp. 335-346.

* cited by examiner

CHEMICAL SYNTHESIS OF CHIRAL CONDUCTING POLYMERS

STATEMENT REGARDING FEDERAL RIGHTS

This invention was made with government support under Contract No. W-74055-ENG-36 awarded by the U.S. Department of Energy. The government has certain rights in the invention.

FIELD OF THE INVENTION

The present invention relates to chiral conducting polymers, especially to chiral polyaniline, more particularly to nanostructured chiral conducting polymers, especially to nanostructured chiral polyaniline, and to methods of preparing the same.

BACKGROUND OF THE INVENTION

Polyaniline has received increased interest for industrial applications (See, e.g., "Plastics that Conduct Electricity" by R. B. Kaner et al., Scientific American 258, 106 (1988)). Chiral conducting polymers are particularly interesting for industrial applications including, e.g., surface-modified electrodes, chemical separation materials, self assembled monolayers, light emitting devices, light filters (Bragg filters), and liquid crystalline devices. Chiral polyaniline has been previously described. In "Chemical Generation of Optically Active Polyaniline via the Doping of Emeraldine Base with Camphorsulfonic Acid" by Majidi, et al., Polymer 36, 3597 (1995), it was disclosed that optically inactive polyaniline could be converted to optically active polyaniline by dissolving the emeraldine base form of polyaniline (EB) in n-methyl-2-pyrrolidinone and adding either (+)- or (−)-camphorsulfonic acid (CSA). More recently, chiral polyaniline was electrochemically synthesized by polymerizing an aqueous solution of aniline in the presence of either (+)- or (−)-CSA (See, e.g., "Facile Preparation of Optically Active Polyanilines via the In Situ Chemical Oxidative Polymerization of Aniline" by Norris et. al., Synthetic Metals 106, 171 (1999)).

Nanostructured materials have attracted much attention for a variety of potential applications.

Water-soluble, chiral polyaniline nanocomposites have been synthesized by electrochemically polymerizing aniline in the presence of optically pure CSA and a dispersant, either polystyrene sulfonate or colloidal silica (See, e.g., "Electrochemical Formation of Chiral Polyaniline Colloids codoped with (+)- or (−)-10-Camphorsulfonic Acid and Polystyrene Sulfonate" by Barisci et al., Macromolecules, 31, 6521 (1998); "Preparation of Chiral Conducting Polymer Colloids" by Barisci et al., Synthetic Metals, 84, 181 (1997); and "Electrochemical Preparation of Chiral Polyaniline Nanocomposites" by Aboutanos et al., Synthetic Metals, 106, 89 (1999).).

Sun et al. and Liu et al. achieved the template-guided synthesis of water-soluble non-chiral polyaniline complexes by polymerizing an aniline monomer in the presence of a polyelectrolyte (See, e.g., Sun et. al., American Chemical Society Polymer Preprints, 33, 379 (1992), Sun et. al., Materials Research Society, Symposium Proceedings, 328, 209 (1994); Sun et al., Materials Research Society, Symposium Proceedings, 328, 167 (1994); and Cushman et al., Journal of Electroanalytical Chemistry, 291, 335 (1986)). The final product is a double-stranded polymer complex in which the polyaniline and the template (polyelectrolyte) are bound by electrostatic interaction (See, e.g., Sun et al., Synth. Metals 84, 67 (1997) and U.S. Pat. No. 5,489,400 by Liu et al. for "Molecular Complex of Conductive Polymer and Polyelectrolyte; and a Process for Producing Same"). Such polyaniline complexes are water soluble because of the hydrophilic nature of the polyelectrolyte. The above references teach that template-guided syntheses are carried out stepwise. First, the template (a pre-formed polymer) and the monomer of the conducting polymer to be prepared are assembled into an adduct, the acidity of the adduct solution is then adjusted, and the polymerization is initiated.

U.S. Pat. No. 6,090,985, by MacDiarmid et al. for "Chiral Polyanilines and the Synthesis Thereof", describes the chemical synthesis of chiral polyanilines which includes polymerizing an aniline monomer in the presence of a chiral dopant acid, an oxidizing agent and, optionally, a substrate. While the products of this synthesis were not described as nanostructures, such as nanofibers and the like, close examination of the product from an example in accordance with example 1 of this patent revealed a nanostructured, nanofiber-like product. However, low chirality levels were reported by MacDiarmid et al. for the resultant chiral polyanilines which is consistent with the low chirality levels found by the present applicants in the repeat of example of this patent.

A need remains for a procedure of forming polyaniline materials with relatively higher chirality than presently available. After extensive and careful investigation, applicants have now prepared polyaniline having high levels of chirality and nanostructured polyaniline having high levels of chirality.

SUMMARY OF THE INVENTION

To achieve the foregoing and other objects, and in accordance with the purposes of the present invention, as embodied and broadly described herein, the present invention provides a method of forming a chiral conducting polymer including reacting a conducting polymer monomer in the presence of a chiral dopant acid to produce a first reaction mixture by addition of a solution including a first portion of an oxidizing agent, the first portion of oxidizing agent characterized as insufficient to allow complete reaction of the monomer, and further reacting the first reaction mixture in the presence of the chiral dopant acid by addition of a solution including a second portion of the oxidizing agent, the second portion of oxidizing agent characterized as insufficient to allow complete reaction of the monomer, and repeating the reaction by addition of further portions of the oxidizing agent until the monomer reaction is complete to produce a chiral conducting polymer. In one embodiment of the invention the chiral conducting polymer is chiral polyaniline. In another embodiment of the invention the chiral polyaniline is characterized as nanostructured. In another embodiment of the invention, the chiral polyaniline is characterized as having a nanofiber/nanotube structure with a diameter of from about 30 nanometers to about 120 nanometers and from about 1 micron to about 5 microns in length and as having a chirality level defined by a molar ellipticity of from about $40 \times 10^3$ degree-cm$^2$/decimole to $700 \times 10^3$ degree-cm$^2$/decimole.

The present invention further includes the above process further including addition of a catalyst during the reaction. In preferred embodiments, the catalyst is selected from among the group consisting of phenylene diamine, aniline oligomers and amino-capped aniline oligomers, and most preferably an amino-capped aniline oligomer wherein n is 2 such that the oligomer is a trimer.

The present invention further provides a nanostructured chiral polyaniline having a nanofiber/nanotubular structure with a diameter of from about 30 nanometers to about 120 nanometers and from about 1 micron to about 5 microns in length, wherein the nanostructured chiral polyaniline has a molar ellipticity of from about $40 \times 10^3$ degree-cm$^2$/decimole to $700 \times 10^3$ degree-cm$^2$/decimole.

DETAILED DESCRIPTION

The present invention is concerned with chiral conducting polymers and to nanofibers or nanotubes of chiral conducting polymers such as polyaniline and the like. Such nanostructured chiral conducting polymers can be prepared with high levels of chirality as defined by high molar ellipticity values.

The term "nanostructure" refers to structures having dimensions of less than 1 micron, generally on the order of a nanometer-scale. The term "nanofiber" refers to elongated structures having a cross section (e.g., angular fibers having edges) or diameter (e.g., rounded) less than 1 micron. The term "nanotube" refers to elongated hollow structures having a diameter less than 1 micron. The structure may be either hollow or solid.

In the present invention, the nanostructured chiral conducting polymers can be prepared by chemical polymerization of a suitable monomer such as aniline and the like in the presence of a chiral acid, an oxidant and suitable oligomers of the monomer such as aniline oligomers.

The conducting polymers useful in the present invention generally includes polyaniline although other conducting polymer materials processed in the same manner may exhibit similar properties, such conducting polymers including polypyrrole and polythiophene.

Polyaniline is the name given to the polymer having the structure, in a completely reduced leucoemeraldine oxidation state, of the general formula:

where n is greater than about 25 and where R is a hydrogen atom. Alternatively, R may be a substituent, such as, for example, an organic group, including, for example, $CH_3$, $C_2H_5$, $OCH_3$, $N(CH_3)_2$, an inorganic group, including, for example, F, Cl, Br, I, or a metal chelate group. For the polyanilines described herein, the appropriate choice of an R group permits a greater range of solubility in a greater number of different types of solvents, which results in increased versatility for processing the polymers and a greater range of chemical properties.

The term "aniline monomer" refers to compounds of the formula:

where each R is independently a hydrogen atom or a substituent such as, for example, an organic group, including, for example, lower alkyl or alkoxy groups with from about 1 to about 6 carbon atoms such as methyl ($CH_3$), ethyl ($C_2H_5$), propyl ($C_3H_7$), methoxy ($OCH_3$), ethoxy ($OC_2H_5$), $N(CH_3)_2$, an inorganic group, including, for example, fluoride (F), chloride (Cl), bromide (Br), iodide (I), or a metal chelate group. Preferably, at least three of the four R groups are hydrogen atoms. "Aniline" generally refers to the above structure in which each R group is a hydrogen atom. The appropriate choice of an R group permits a greater range of solubility in a greater number of different types of solvents, which results in increased versatility for processing the polymers and a greater range of chemical properties. The term "aniline oligomers" refers to compounds of the formula:

where n is 1 to 6. Such an aniline oligimer may also be substituted with one or more each R groups as described before for polyaniline. The term "amino-capped aniline oligomers" refers to compounds of the formula:

where n is 1 to 6. Such an amino-capped aniline oligomer may also be substituted with one or more each R groups as described before for polyaniline.

In a first embodiment of the present invention, a method of chemically synthesizing nanostructured chiral polyanilines includes polymerizing an aniline monomer in the presence of an oxidizing agent, a chiral dopant acid and aniline oligomers to produce a nanostructured chiral polyaniline in the form of nanofibers or nanotubes. In particular, the reaction for chemically synthesizing nanostructured chiral polyanilines may be conducted as follows.

In one embodiment of the present process, an aniline monomer is mixed with a chiral dopant acid. The molar ratio of aniline monomer to chiral dopant acid is generally from about 1:1.5 to about 1:7, preferably about 1:5 to about 1:7. Generally, the molar concentration of chiral dopant acid is from about 0.2 M to about 10 M, preferably about 10 M. The reaction is preferably conducted at about room temperature in an aqueous solution, although other polar solvents, such as, for example, methanol or acetonitrile, may be used. The reaction is an redox reaction that generally occurs over a few hours time. The pH during the reaction is generally from about −1 to about 1.

Generally, an oxidizing agent is dissolved in an aqueous solution. Generally, the molar concentration of oxidizing agent is about 0.4 M to about 2.2 M. The molar ratio of oxidizing agent to monomer is generally from about 0.5:1 to about 1.5:1, preferably about 1:1. The dissolution of the oxidizing agent generally occurs at room temperature in a few minutes time with magnetic stirring.

In another embodiment of the invention, a catalyst is added to a mixture of a monomer, e.g., an aniline monomer, a chiral dopant acid and an oxidant as in the earlier described embodiment of the invention. In general, only minor amounts of the catalyst is added to the mixture. The minor amounts can generally be about 10 percent by weight of the total weight of monomer, although this amount may be varied. Suitable catalysts for this embodiment include phenylene diamine, aniline oligomers as described above, amino-capped aniline oligomers as described above, and metal salts such as iron chloride, copper chloride and silver nitrate. A catalyst such as benzidine may also be employed but is generally not preferred. Generally, n in the structures can be from about 1 to about 6, and the catalyst where n is 2 for the amino capped material is especially preferred.

In this additional embodiment, an oxidizing agent solution can be mixed with a solution resulting from an aniline monomer/chiral dopant acid reaction together with a catalyst such as an aniline oligomer catalyst, leading to the formation of a dark green precipitate that is a chiral polyaniline salt in the emeraldine oxidation state. The reaction can proceed at room temperature for the necessary time in an aqueous solution, although other solvents which can dissolve the aniline monomer may be used.

In the above reactions, suitable chiral dopant acids include, but are not limited to, (1S)-(+) camphorsulfonic acid, (1R)-(−) camphorsulfonic acid, L-tartaric acid and D-tartaric acid; preferably (1S)-(+) camphorsulfonic acid. Other suitable chiral acids for doping polyaniline may include D- or L-dibenzoyltartaric acid, (1S)-(+)-3-bromocamphor-10-sulfonic acid, 2-amino-7,7-dimethylbicyclop[2,2,1]heptan-1-methylene sulfonic acid and 2-acrylamide-7,7-dimethylbicyclo[2,2,1]heptan-1-methylene sulfonic acid and the like. Generally speaking, if a chiral dopant acid is a strong acid ($pK_a<3$) and soluble in water, N-methyl-2-pyrrolidinone (NMP), dimethyl sulfoxide (DMSO) or N,N-dimethylformamide (DMF), it can be used to generate chiral polyaniline. Therefore, other hydroxy and sulfonic acids should be suitable dopant acids. Preferably, the dopant acid should be water-soluble.

Also, in the above reactions, suitable oxidizing agents include, for example, iron (III) chloride hexahydrate ($FeCl_3.6H_2O$), ammonium peroxydisulfate (($NH_4)_2S_2O_8$), cerium (IV) sulfate ($Ce(SO_4)_2$), potassium permanganate ($KMnO_4$), potassium bromate ($KBrO_3$), potassium dichromate ($K_2Cr_2O_7$), potassium iodate ($KIO_3$), hydrogen peroxide ($H_2O_2$), vanadium pentoxide ($V_2O_5$), sodium metavanadate ($NaVO_3$), sodium hypochlorite (NaClO) and the like; preferably ammonium peroxydisulfate.

The chiral polyaniline formed in the process of the present invention can be in nanostructure dimensions (in the form of nanofibers and/or nanotubes) generally with diameters of from about 30 to 120 nanometers (nm) and can be from about 1 to about 5 microns (μm) in length. Such nanofibers/nanotubes have a large surface area allowing for easy interaction with other materials during chemical separations and the like.

The molar ellipticity of the polyaniline formed in the processes of the present invention is generally greater than about $40\times10^3$ degree-$cm^2$/decimole. Preferred polyaniline structures of nanofibers/nanotubes can have molar ellipticities as high as from about $40\times10^3$ degree-$cm^2$/decimole to about $700\times10^3$ degree-$cm^2$/decimole. Such chirality is higher than previously reported chiral conducting polymers and especially chiral conducting polyanilines. It is expected that higher chirality should provide better materials for chiral recognition and separations.

The novel nanostructured chiral polyanilines described and synthesized herein may be used, for example, as electrodes for asymmetric synthesis, as biological sensors and as chiral separation materials in pharmaceutical applications.

As one skilled in the art would recognize, no CD spectrum would be obtained in the absence of a chiral species or in the presence of equal quantities of the D- and L- forms of the chiral species.

The present invention is more particularly described in the following examples which are intended as illustrative only, since numerous modifications and variations will be apparent to those skilled in the art.

Aniline (99.5%, Aldrich) was distilled before use. (1S)-(+) camphorsulfonic acid (98%, Aldrich), (1R)-(−) camphorsulfonic acid (98%, Aldrich), and ammonium peroxydisulfate (99%, Fisher Scientific) were used as received.

UV-Vis spectra were obtained using a Cary 500 Scan. Circular Dichroism (CD) spectra were obtained using a Jasco 710 spectrometer having a scan rate of 200 nanometers per minute (nm/min). Samples were prepared by filling the quartz cell (2 millimeter (mm) path length) with the precipitate diluted to 2.9 mM in aqueous solution. Transmission electron micrographs (TEM) were taken with a Phillips CM-30 transmission electron microscope.

EXAMPLE 1

Synthesis of a chiral polyaniline product was as follows. About 0.2 g of aniline and 3.48 g of (1S)-(+) camphorsulfonic acid were dissolved in 10 ml of water. About 0.49 g of ammonium peroxydisulfate was dissolved in about 5 ml of water. The solution of ammonium peroxydisulfate was divided into five equal portions and was added to the solution of aniline one portion at a time with stirring. Each successive portion was added when the solution turned from blue to green. As the reaction volume was only 15 ml, the reaction mixture was maintained in a water bath at about 20° C. to prevent the temperature of the reaction mixture from rising too high.

Figure 1:
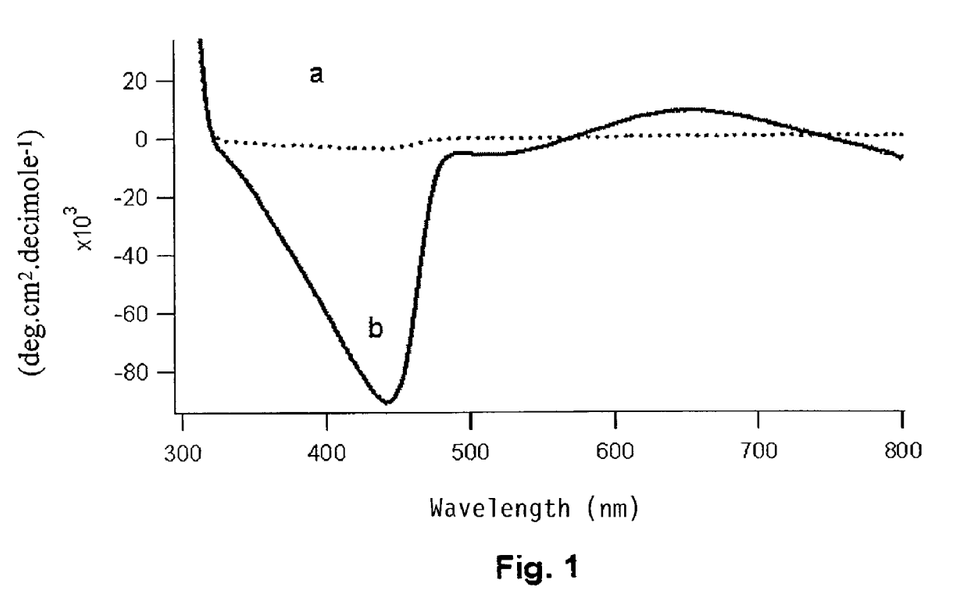
FIG. 1 shows circular dichroism (CD) spectra of the as-synthesized reaction products from the syntheses described in Example 1 in accordance with the present invention and Example 2 (comparative example).

After the reaction was completed (after reaching total oxidant equivalents of 1 to 1 equivalent of aniline monomer), the reaction mixture was centrifuged, the liquid was separated and the reaction product was washed with water. The reaction product was examined by UV-Vis indicating that the product was polyaniline. The Circular Dichroism spectra of the as-synthesized polyaniline reaction product as a suspension in water was obtained and is shown in FIG. 1 at line 10 exhibiting a molar ellipticity of about $90 \times 10^3$ degree-cm$^2$/decimole. Additional centrifuging and washing cycles were repeated until the liquid was colorless to obtain a purified product. The polyaniline reaction product was stored as a suspension in water.

Examination of the polyaniline reaction product by TEM showed that the material had a nanofibrous structure with fiber diameters of from about 30 to about 70 nanometers and a length of several hundred nanometers.

EXAMPLE 2 (COMPARATIVE EXAMPLE)

Synthesis of a chiral polyaniline product was conducted in accordance with process described in U.S. Pat. No. 6,090,985. About 2 ml of aniline was added to 200 ml of 1.0M aqueous (1S)-(+) camphorsulfonic acid solution. About 1.15 g of ammonium peroxydisulfate was dissolved in about 10 ml aqueous solution of 1.0M (1S)-(+) camphorsulfonic acid. The solution of ammonium peroxydisulfate was quickly added over several seconds to the solution of aniline with stirring for a period of one and one-half hours.

After the reaction was completed, the precipitate was collected, and washed with about 400 ml of an aqueous solution of 0.1M (1S)-(+) camphorsulfonic acid. Washing was repeated until the filtrate was colorless. The precipitate was then dried at room temperature in a vacuum desiccator.

Examination of the precipitate by TEM and AFM showed that the precipitate was principally in the form of particles although some nanofibrous structures were observed. The Circular Dichroism of the precipitate is shown in FIG. 1 at line 12 exhibiting a molar ellipticity of about $5 \times 10^3$ degree-cm$^2$/decimole.

EXAMPLE 3

The process of example 1 was followed using varying amounts of the chiral acid. Multiple samples were prepared, each containing about 0.2 g of aniline and varying amounts of (1S)-(+) camphorsulfonic acid dissolved in 10 ml of water. The amounts of (1S)-(+) camphorsulfonic acid were calculated to give molar concentrations of the (1S)-(+) camphorsulfonic acid of 0.5 M, 1 M, 1.5 M and 2 M in respective samples. For each sample, about 0.49 g of ammonium peroxydisulfate was dissolved in about 5 ml of water, divided into five equal portions and added to the respective solutions of aniline one portion at a time with stirring. The reaction mixtures were maintained in a water bath at about 20° C. to prevent the temperature of the reaction mixtures from rising too high.

Figure 2:
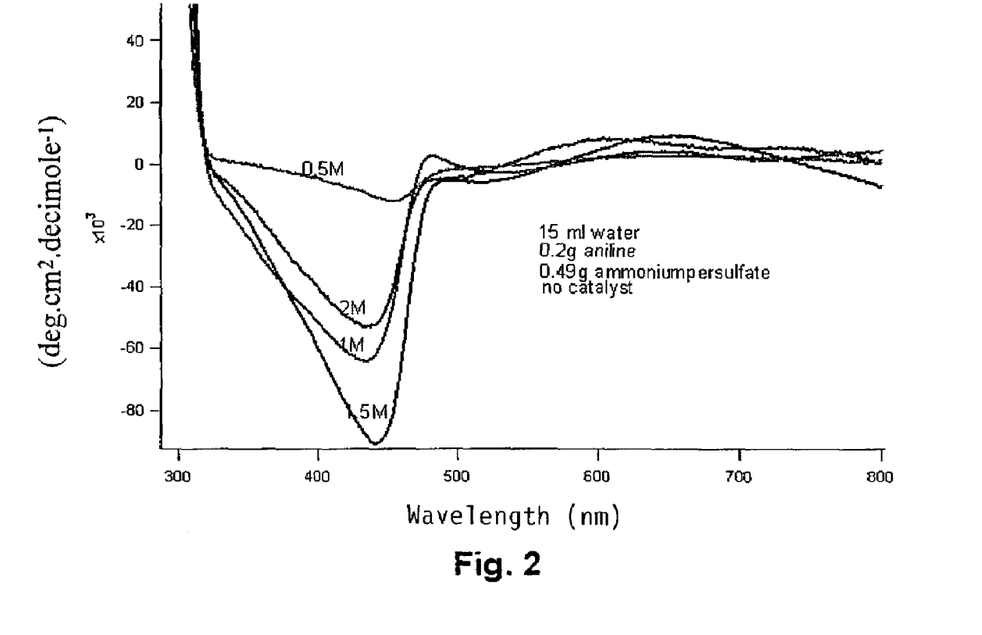
FIG. 2 shows circular dichroism (CD) spectra of the as-synthesized reaction products from the syntheses in accordance with the present invention described in Example 3 wherein different levels of (1S)-(+) camphorsulfonic acid were employed as the chiral acid reactant.

The Circular Dichroism spectra of the as-synthesized polyaniline reaction products as suspensions in water were obtained and are shown in FIG. 2 at line 20 for [CSA] of 0.5 M, at line 22 for [CSA] of 2 M, at line 24 for [CSA] of 1 M, and at line 26 for [CSA] of 1.5 M exhibiting a molar ellipticity of about $90 \times 10^3$ degree-cm$^2$/decimole. These results indicated that chirality level of the precipitate increased as CSA concentration levels increased from 0.5 M to 1.5 M and decreased at CSA concentration levels of 2 M. CSA concentration levels from about 1.0 M to 1.5 M resulted in the highest molar ellipticity.

EXAMPLE 4

The process of example 1 was followed using varying total volumes of the reaction volume. Multiple samples were prepared, each containing about 0.2 g of aniline and 3.48 g of (1S)-(+) camphorsulfonic acid dissolved in varying amounts of water (40 ml, 10 ml, 5 ml and 1.5 ml respectively). About 0.49 g of ammonium peroxydisulfate was dissolved in varying amounts of water (10 ml, 5 ml, 2 ml and 1 ml respectively), divided into five equal portions and added to the respective solutions of aniline one portion at a time with stirring. The reaction mixtures were maintained in a water bath at about 20° C. to prevent the temperature of the reaction mixtures from rising too high.

Figure 3:
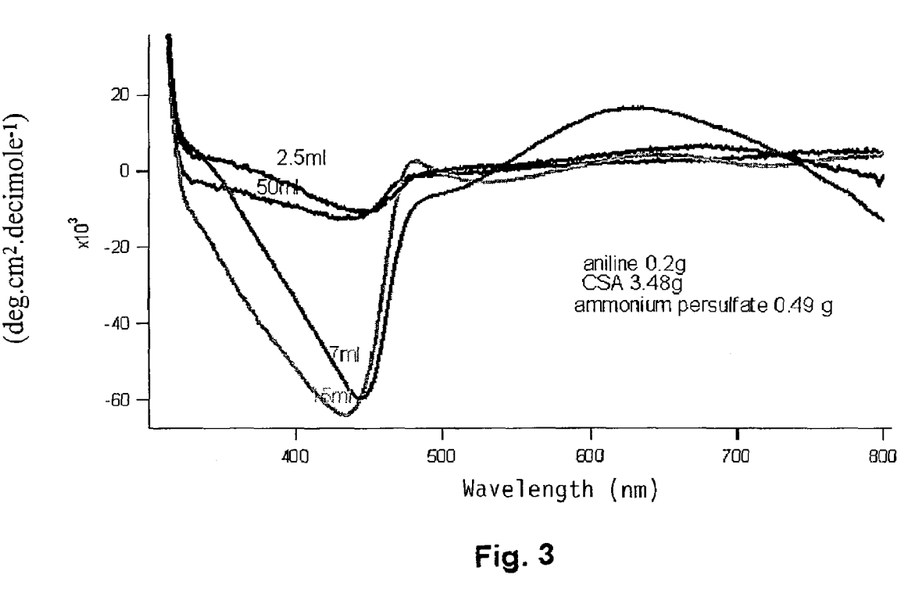
FIG. 3 shows circular dichroism (CD) spectra of the as-synthesized reaction products from the syntheses in accordance with the present invention described in Example 4 wherein different levels of total volume were employed during the reaction.

The Circular Dichroism spectra of the as-synthesized polyaniline reaction products as suspensions in water were obtained and are shown in FIG. 3 at line 30 for total reaction volume of 2.5 ml, at line 32 for total reaction volume of 50 ml, at line 34 for total reaction volume of 7 ml, and at line 36 for total reaction volume of 15 ml exhibiting a molar ellipticity of about $60 \times 10^3$ degree-cm$^2$/decimole. These results indicated that chirality levels of the precipitate increased as total reaction volume increased from 2.5 ml to 15 ml and decreased at total reaction volume of 50 ml. Total reaction volumes from about 7 ml to about 15 ml resulted in the highest molar ellipticity.

EXAMPLE 5

The general process of example 1 was followed using varying total volumes of the reaction volume and a catalyst of the amino-capped aniline oligomer as shown at FIG. 11(c) wherein n is 1 so the oligomer is a dimer. Multiple samples were prepared, each containing about 0.2 g of aniline, 3.48 g of (1S)-(+) camphorsulfonic acid and 0.02 g of the amino-capped aniline oligomer dissolved in varying amounts of water (20 ml, 10 ml, 8 ml, 3 ml, 1.5 ml and 1.2 ml respectively). About 0.49 g of ammonium peroxydisulfate was dissolved in dissolved in varying amounts of water (10 ml, 5 ml, 2 ml, 2 ml, 1 ml and 0.7 ml respectively), divided into five equal portions and added to the respective solutions of aniline one portion at a time with stirring. The reaction mixtures were maintained in a water bath at about 20° C. to prevent the temperature of the reaction mixtures from rising too high.

Figure 5:
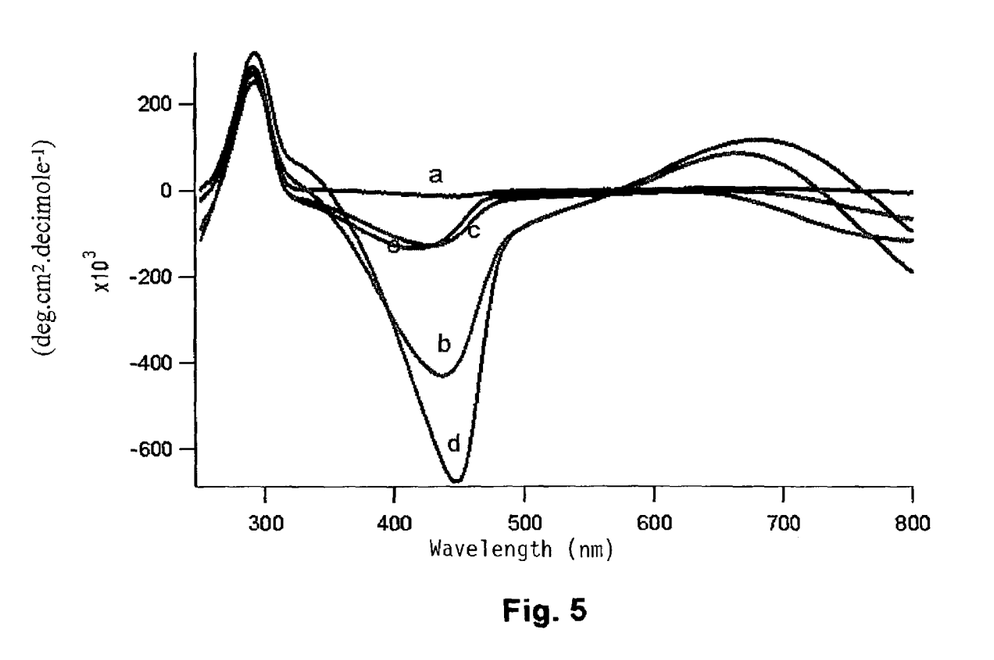
FIG. 5 shows circular dichroism (CD) spectra of the as-synthesized reaction products from the syntheses in accordance with the present invention described in Example 6 wherein different catalysts were employed for the reaction.

The Circular Dichroism spectra of the as-synthesized polyaniline reaction products as suspensions in water were obtained and are shown in FIG. 5 at line 50 for a total reaction volume of 30 ml, at line 51 for a total reaction volume of 15 ml, at line 52 for a total reaction volume of 10 ml, at line 53 for a total reaction volume of 2 ml, at line 54 for a total reaction volume of 5 ml, and at line 55 for a total reaction volume of 2.5 ml exhibiting a molar ellipticity of about $450 \times 10^3$ degree-cm$^2$/decimole. These results indicated that chirality levels of the precipitate increased with the catalyst of the amino-capped aniline oligomer at lower total reaction volumes until the volume decreased from 2.5 ml to 2 ml whereat the reaction solution became too viscous for effective reaction.

EXAMPLE 6

The general process of example 1 was followed using differing catalysts. Multiple samples were prepared, each containing about 0.2 g of aniline and 3.48 g of (1S)-(+) camphorsulfonic acid, and a respective catalyst of a blank, phenylene diamine, an amino-capped aniline oligomer wherein n is 1 so the oligomer is a dimer, an amino-capped aniline oligomer wherein n is 2 so the oligomer is a trimer, and an amino-capped aniline oligomer where n is 6 so the oligimer is a 7-mer, each mixture dissolved in 1.5 g of water. About 0.49 g of ammonium peroxydisulfate was dissolved in 1 ml of water, divided into five equal portions and added to the respective solutions of aniline one portion at a time with stirring. The reaction mixtures were maintained in a water bath at about 20° C. to prevent the temperature of the reaction mixtures from rising too high.

Figure 4:
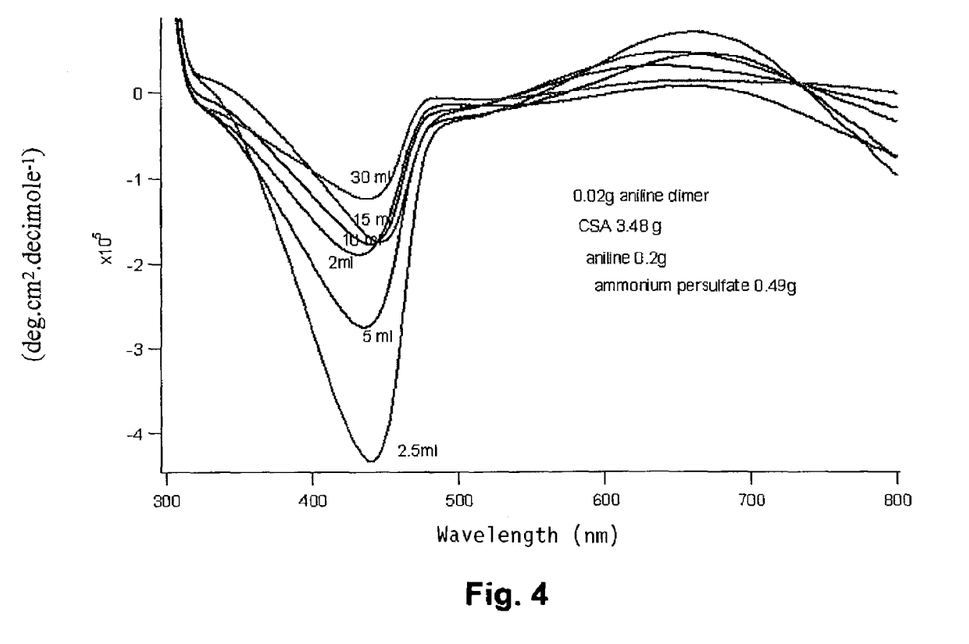
FIG. 4 shows circular dichroism (CD) spectra of the as-synthesized reaction products from the syntheses in accordance with the present invention described in Example 5 wherein different levels of total volume were employed during the reaction.

The Circular Dichroism spectra of the as-synthesized polyaniline reaction products as suspensions in water were obtained and are shown in FIG. 4 at line 40 for no catalyst, at line 42 for a catalyst of phenylene diamine exhibiting a molar ellipticity of about $400 \times 10^3$ degree-cm$^2$/decimole, at line 44 for a catalyst of the amino-capped aniline dimer, at line 46 for a catalyst of the amino-capped aniline trimer exhibiting a molar ellipticity of about $650 \times 10^3$ degree-cm$^2$/decimole, and at line 48 for a catalyst of the amino-capped aniline heptamer. These results indicated that chirality levels of the precipitate increased with the use of catalysts including catalysts of aniline dimers, trimers and higher oligomers. Also, the highest chirality level was obtained with addition of a catalyst of the amino-capped aniline trimer.

EXAMPLE 7

The general process of example 1 was followed varying amounts of the chiral acid and a catalyst of the aniline dimer as shown above wherein n is 1 so the oligomer is a dimer. Multiple samples were prepared, each containing about 0.2 g of aniline, the (1S)-(+) camphorsulfonic acid, and 0.02 g of the aniline dimer, each mixture dissolved in 1.5 g of water. The amounts of (1S)-(+) camphorsulfonic acid were 1.5 g, 2.5 g, 3.0 g, and 3.5 g in respective samples. About 0.49 g of ammonium peroxydisulfate was dissolved in 1 ml of water, divided into five equal portions and added to the respective solutions of aniline one portion at a time with stirring. The reaction mixtures were maintained in a water bath at about 20° C. to prevent the temperature of the reaction mixtures from rising too high.

Figure 6:
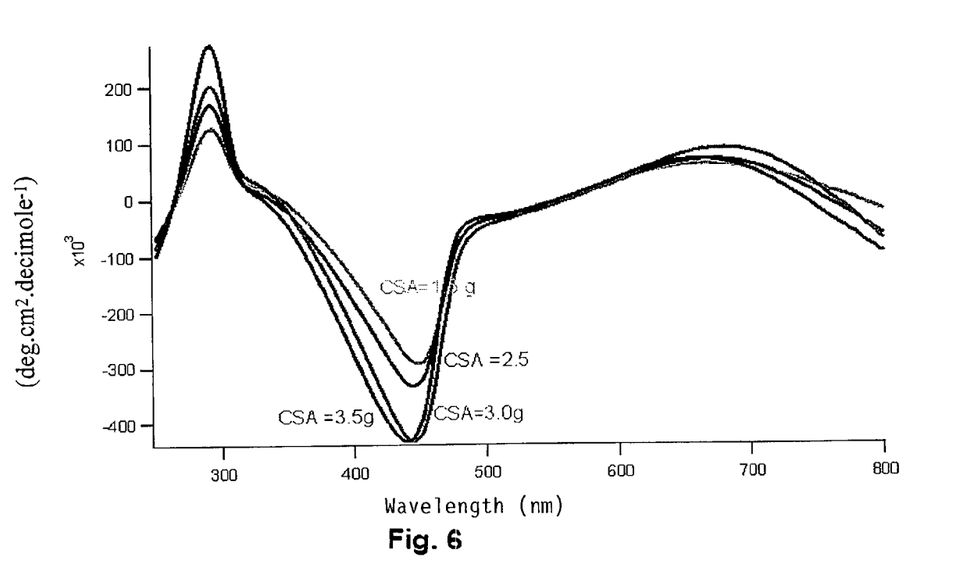
FIG. 6 shows circular dichroism (CD) spectra of the as-synthesized reaction products from the syntheses in accordance with the present invention described in Example 7 wherein different levels of (1S)-(+) camphorsulfonic acid were employed as the chiral acid reactant.

The Circular Dichroism spectra of the as-synthesized polyaniline reaction products as suspensions in water were obtained and are shown in FIG. 6 at line 60 for 1.5 g of the CSA, at line 62 for 2.5 g of the CSA, at line 64 for 3.0 g of the CSA and at line 66 for 3.5 g of the CSA exhibiting a molar ellipticity of about $650 \times 10^3$ degree-cm$^2$/decimole exhibiting a molar ellipticity of about $450 \times 10^3$ degree-cm$^2$/decimole. These results indicated that chirality levels of the precipitate increased with the use of higher amounts of the chiral acid together with the aniline dimer as a catalyst although there are solubility limits to the amount of chiral acid in the small reaction volumes.

EXAMPLE 8

The general process of example 1 was followed varying amounts of the catalyst of the amino-capped aniline oligomer wherein n is 2 so the oligomer is a trimer. Multiple samples were prepared, each containing about 0.2 g of aniline, 3.48 g of (1S)-(+) camphorsulfonic acid, and 0.01 g, 0.02 g and 0.04 g of the amino-capped aniline trimer respectively, each mixture dissolved in 1.5 g of water. About 0.49 g of ammonium peroxydisulfate was dissolved in 1 ml of water, divided into five equal portions and added to the respective solutions of aniline one portion at a time with stirring. The reaction mixtures were maintained in a water bath at about 20° C. to prevent the temperature of the reaction mixtures from rising too high.

Figure 7:
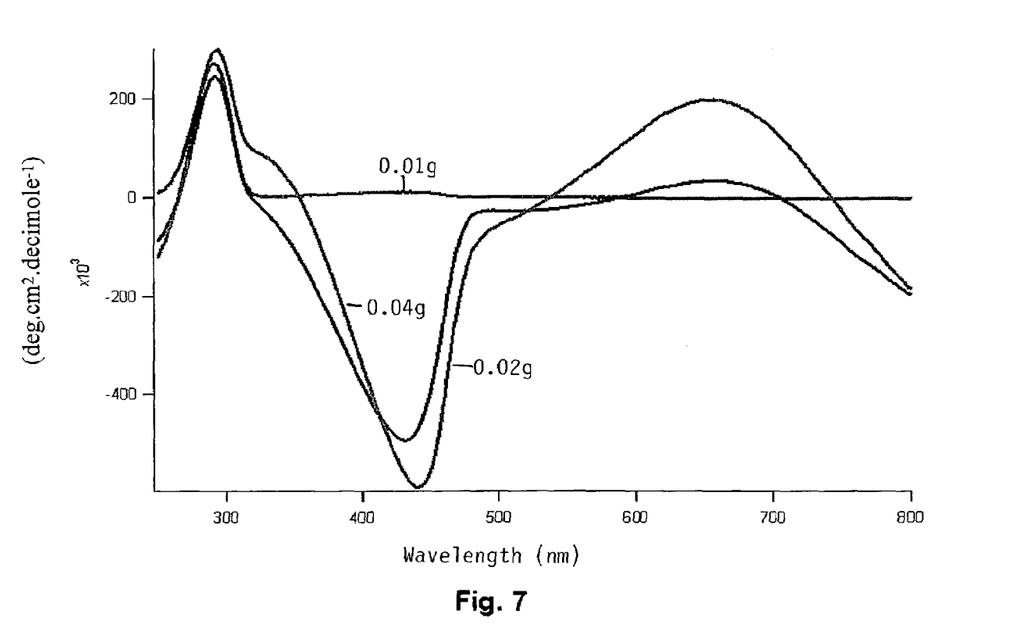
FIG. 7 shows circular dichroism (CD) spectra of the as-synthesized reaction products from the syntheses in accordance with the present invention described in Example 8 wherein different levels of an amino-capped oligomer catalyst were employed during the reaction.

The Circular Dichroism spectra of the as-synthesized polyaniline reaction products as suspensions in water were obtained and are shown in FIG. 7 at line 70 for 0.01 g of the amino-capped aniline oligomer, at line 72 for 0.04 g of the amino-capped aniline oligomer, and at line 74 for 0.02 g of the amino-capped aniline oligomer exhibiting a molar ellipticity of about $650 \times 10^3$ degree-cm$^2$/decimole. These results indicated that chirality levels of the precipitate increased with the use of higher amounts of the catalyst but decreased at even higher amounts of the catalyst in low total reaction volumes.

EXAMPLE 9

Two samples were conducted using the general process of example 7. The first sample included about 0.2 g of aniline, 3.48 g of the (1S)-(+) camphorsulfonic acid, and 0.02 g of the amino-capped aniline oligomer wherein n is 2 so the oligomer is a trimer, all dissolved in 1.5 ml of water. The second sample included about 0.2 g of aniline, 3.48 g of the (1S)-(−) camphorsulfonic acid, and 0.02 g of the same amino-capped aniline oligomer, all dissolved in 1.5 ml of water.

About 0.49 g of ammonium peroxydisulfate was dissolved in 1 ml of water, divided into five equal portions and added to the respective samples of aniline one portion at a time with stirring. The reaction mixtures were maintained in a water bath at about 20° C. to prevent the temperature of the reaction mixtures from rising too high.

After preparation of the two samples, each doped sample was de-doped by standard techniques for polyaniline de-doping, in this case by addition of ammonium hydroxide.

Figure 8:
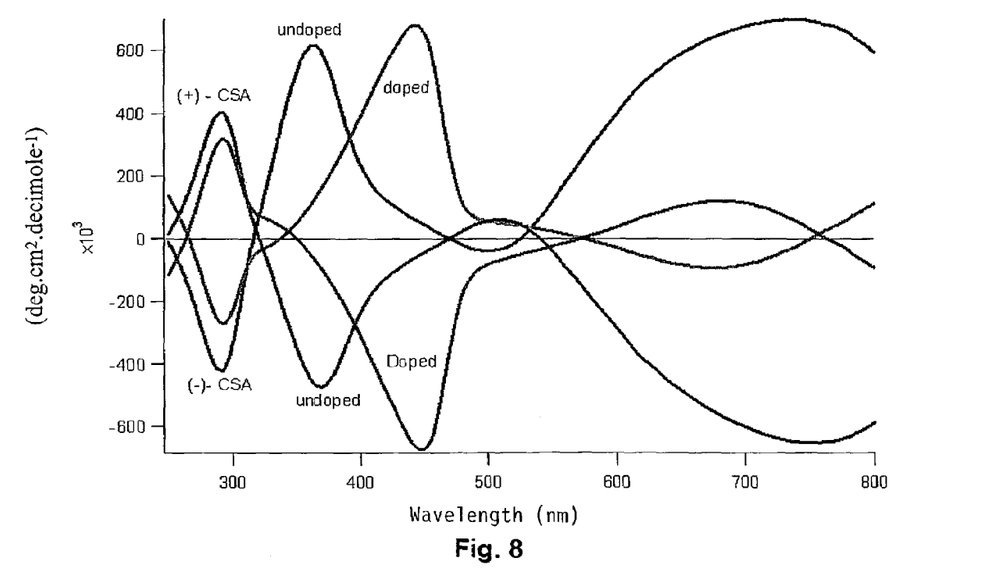
FIG. 8 shows circular dichroism (CD) spectra of the as-synthesized reaction products from the syntheses in accordance with the present invention described in Example 9. The spectra of both doped and de-doped polyaniline are shown together with both (1S)-(+) camphorsulfonic acid and (1S)-(−) camphorsulfonic acid as the chiral acid reactant.
Figure 9:
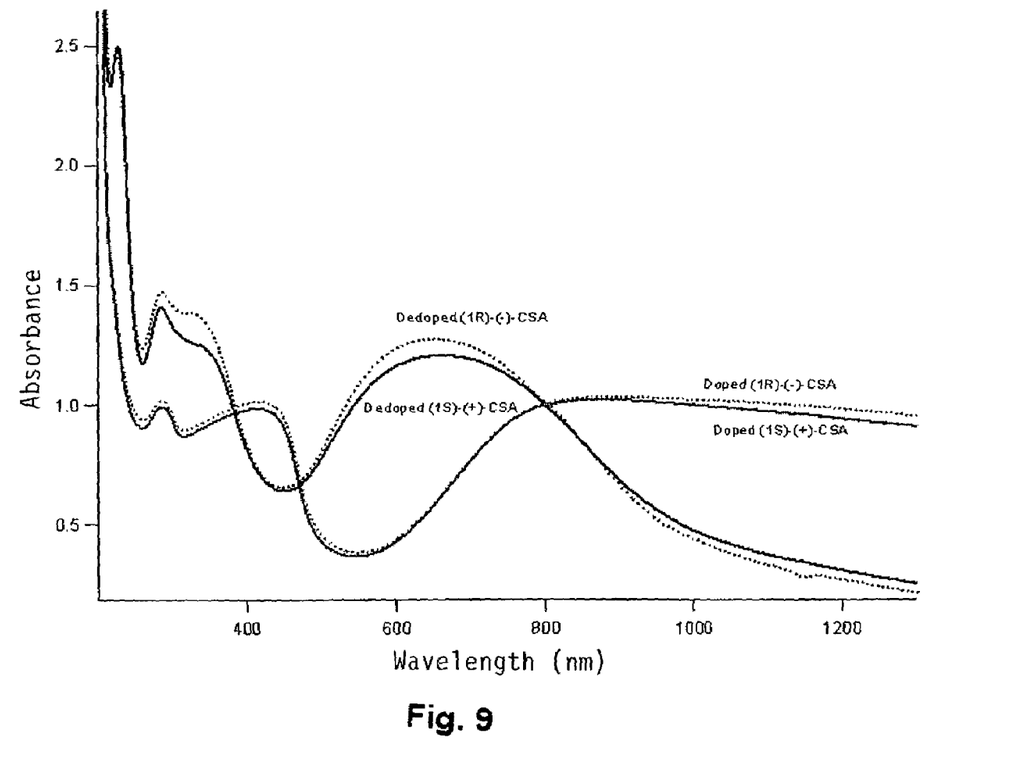
FIG. 9 shows UV-Vis spectra of both doped and de-doped polyaniline from the syntheses in accordance with the present invention using both (1S)-(+) camphorsulfonic acid and (1R)-(−) camphorsulfonic acid as the chiral acid reactant.

The Circular Dichroism spectra of the as-synthesized polyaniline reaction products as suspensions in water were obtained and are shown in FIG. 8 at line 80 for the first sample, at line 82 for 0.4 g for the second sample, at line 84 for the de-doped first sample, and at line 86 for the de-doped second sample. It can be seen that the spectra for the first and second samples and for the de-doped first and second samples are essentially mirror images of one another as would be expected. The UV spectra of the doped and de-doped samples is shown in FIG. 9. The difference in spectra between the doped and de-doped samples is a shift of the major peak from about 350 nanometers (de-doped) to about 450 nanometers (doped).

EXAMPLE 10

The process of example 1 was followed to prepare a sample of purified chiral polyaniline. A portion of the chiral polyaniline was heated at 90° C. for one hour to determine the thermal stability of the material.

Figure 10:
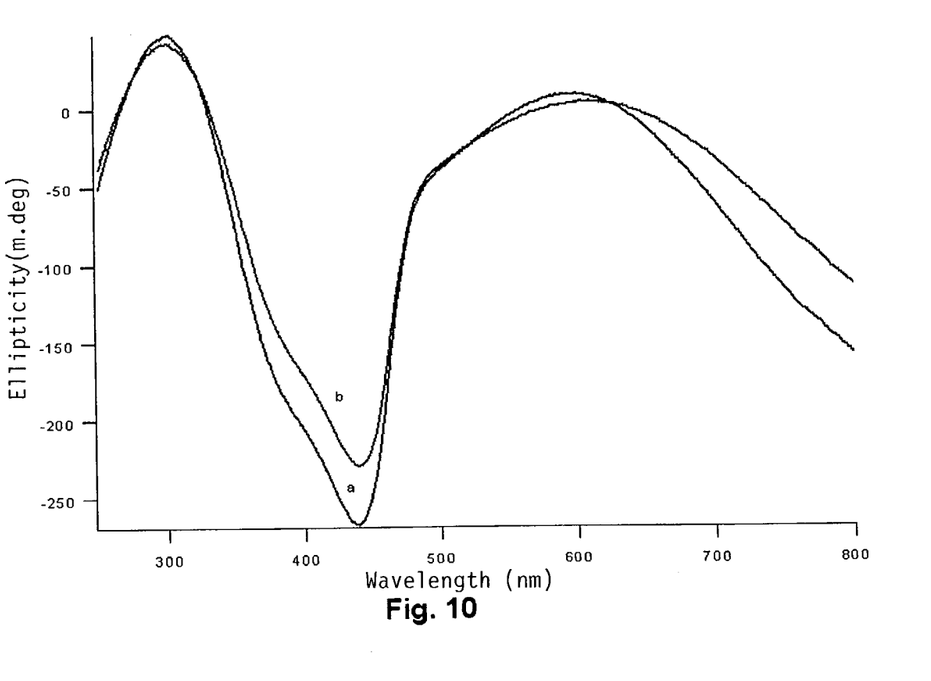
FIG. 10 shows circular dichroism (CD) spectra of purified chiral polyaniline prepared in accordance with the present invention and the same purified chiral polyaniline after heating at 90° C. for one hour.

The Circular Dichroism spectra of the unheated and heated samples are shown in FIG. 10 at line 90 for the unheated sample, at line 92 for the heated sample. The spectra indicate that there was no detrimental effect by the heating.

EXAMPLE 11

The process of example 1 was followed to prepare a sample of chiral polyaniline. The sample was then subjected to repeated de-doping and re-doping cycles using ammonium hydroxide and (1S)-(+) camphorsulfonic acid.

The Circular Dichroism spectra of the sample through successive doping and de-doping cycles was examined and there was a minor decrease in the maximum chirality level over the series of cycling.

Although the present invention has been described with reference to specific details, it is not intended that such details should be regarded as limitations upon the scope of the invention, except as and to the extent that they are included in the accompanying claims.

What is claimed is:

1. A method of forming a chiral conducting polymer comprising:

reacting a monomer in the presence of a chiral dopant acid by addition of a solution including a first portion of an oxidizing agent to produce a first reaction mixture, said first portion of oxidizing agent characterized as insufficient to allow complete reaction of said monomer;

further reacting the first reaction mixture in the presence of the chiral dopant acid by addition of a solution including a second portion of said oxidizing agent to produce a second reaction mixture, said second portion of oxidizing agent characterized as insufficient to allow complete reaction of said monomer;

repeating said reaction by addition of further portions of said oxidizing agent solution until the monomer reaction is complete to produce said chiral conducting polymer.

2. The method of claim 1 wherein said conducting polymer is polyaniline and said monomer is aniline.

3. The method of claim 2 wherein said chiral polyaniline is characterized as having a chirality level defined by a molar ellipticity of greater than about $40 \times 10^3$ degree-cm$^2$/decimole.

4. The method of claim 2 wherein said chiral polyaniline is characterized as having a nanofiber structure with a diameter of from about 30 nanometers to about 120 nanometers and from about 1 micron to about 5 microns in length and a chirality level defined by a molar ellipticity of greater than about $40 \times 10^3$ degree-cm$^2$/decimole.

5. The method of claim 3 wherein said chiral polyaniline is characterized as having a nanofiber structure with a diameter of from about 30 nanometers to about 120 nanometers and from about 1 micron to about 5 microns in length and a chirality level defined by a molar ellipticity of from about $40 \times 10^3$ degree-cm$^2$/decimole to about $700 \times 10^3$ degree-cm$^2$/decimole.

6. The method of claim 2 wherein said reaction is conducted in aqueous medium.

7. The method of claim 2 wherein said chiral dopant acid is selected from the group consisting of (1S)-(+) camphorsulfonic acid, (1R)-(−) camphorsulfonic acid, L-tartaric acid and D-tartaric acid.

8. The method of claim 2 wherein said oxidizing agent is selected from the group consisting of $FeCl_3 \cdot 6H_2O$, $(NH_4)_2S_2O_8$, $Ce(SO_4)_2$, $KMnO_4$, $KBrO_3$, $K_2Cr_2O_7$, $KIO_3$, $H_2O_2$, $V_2O_5$, $NaVO_3$ and $NaClO$.

9. The method of claim 2 wherein said oxidizing agent is ammonium peroxydisulfate.

10. The method of claim 1 wherein reaction of monomer with an oxidizing agent in the presence of a chiral dopant acid includes addition of a catalyst.

11. The method of claim 2 wherein reaction of aniline monomer with an oxidizing agent in the presence of a chiral dopant acid includes addition of a catalyst.

12. The method of claim 11 wherein said catalyst is selected from the group consisting of phenylene diamine, aniline oligomers and amino-capped aniline oligomers.

13. The method of claim 2 wherein said reaction of aniline monomer with an oxidizing agent in the presence of a chiral dopant acid includes addition of a catalyst of an amino-capped aniline oligomer wherein said oligomer is a trimer.

* * * * *